(12) United States Patent
Kaise et al.

(10) Patent No.: US 7,123,334 B2
(45) Date of Patent: Oct. 17, 2006

(54) LIQUID CRYSTAL DISPLAY DEVICE AND LIQUID CRYSTAL PROJECTOR DEVICE

(75) Inventors: Kikuo Kaise, Kanagawa (JP); Mikiya Kobayashi, Kanagawa (JP); Shizuo Nishihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/182,470

(22) PCT Filed: Dec. 4, 2001

(86) PCT No.: PCT/JP01/10591

§ 371 (c)(1),
(2), (4) Date: Jan. 6, 2003

(87) PCT Pub. No.: WO02/46834

PCT Pub. Date: Jun. 13, 2002

(65) Prior Publication Data

US 2003/0147036 A1 Aug. 7, 2003

(30) Foreign Application Priority Data

Dec. 8, 2000 (JP) ............................. 2000-373820
Feb. 15, 2001 (JP) ............................. 2001-38033
Mar. 7, 2001 (JP) ............................. 2001-62838

(51) Int. Cl.
*G02F 1/1333* (2006.01)
*G02F 1/1335* (2006.01)
(52) U.S. Cl. ............................. 349/161; 349/5; 349/96; 349/117

(58) Field of Classification Search ................ 349/161, 349/5, 96, 117
See application file for complete search history.

(56) References Cited

U.S. PATENT DOCUMENTS

| 5,757,443 | A | | 5/1998 | Kobayashi |
| 5,875,008 | A | * | 2/1999 | Takahara et al. ................ 349/5 |
| 5,978,054 | A | * | 11/1999 | Fujimori ....................... 349/60 |
| 6,057,894 | A | | 5/2000 | Kobayashi |

FOREIGN PATENT DOCUMENTS

| EP | 63010128 | 1/1988 |
| EP | 04317024 | 11/1991 |
| EP | 10282483 | 10/1998 |
| EP | 2000089364 | 3/2000 |
| EP | 1 016 894 | 7/2000 |
| EP | 2000275599 | 10/2000 |
| EP | 2000284700 | 10/2000 |

(Continued)

*Primary Examiner*—Tarifur R. Chowdhury
(74) *Attorney, Agent, or Firm*—Sonnenschein Nath & Rosenthal LLP (57) ABSTRACT

The present invention is a liquid crystal projector device using a liquid crystal panel. The device mounts a liquid crystal panel (16) on a light incident plane of a polyhedral dichroic prism (23) in a bonded state so as to integrate the panel with the prism, and comprises a heat sink (29) and a heat pipe (31) which forcedly cools the integrated structure statically. The liquid crystal projector device comprising the structure describe above cools the liquid crystal panel efficiently without bringing any trouble caused by fan noise or raise of dust.

3 Claims, 9 Drawing Sheets

FOREIGN PATENT DOCUMENTS

| | | |
|---|---|---|
| EP | 2000305176 | 11/2000 |
| JP | 63-010128 | 1/1988 |
| JP | 63-068645 | 5/1988 |
| JP | 63-134269 | 9/1988 |
| JP | 05-036422 | 5/1993 |
| JP | 06-118368 | 4/1994 |
| JP | 09-113906 | 5/1997 |
| JP | 10-282483 | 10/1998 |
| JP | 11-038378 | 2/1999 |
| JP | 11-258567 | 9/1999 |
| JP | 2000-258859 | 9/2000 |
| JP | 2000-275599 | 10/2000 |
| JP | 2000-284700 | 10/2000 |
| JP | 2000-305045 | 11/2000 |
| JP | 2000-305176 | 11/2000 |

\* cited by examiner

LIQUID CRYSTAL DISPLAY DEVICE AND LIQUID CRYSTAL PROJECTOR DEVICE

TECHNICAL FIELD

The present invention relates to a liquid crystal display device and a liquid crystal projector device, and further to a panel cooling method.

BACKGROUND OF THE INVENTION

In these days, a liquid crystal projector device using a liquid crystal panel as a liquid crystal light valve therein has been developed evidently. As the liquid crystal projector device, there are mainly considered a data projector device configured for a personal computer, a front projector device configured for a home theater, and further, there is considered a rear projector device configured for a rear projection television.

The liquid crystal projector device is roughly divided into two types, that is, a single-panel type which uses a liquid crystal light valve (liquid crystal panel) with color filters of three colors, i.e., R (red), G (green) and B (blue), and a three-panel type which uses three monochrome liquid crystal light valves (liquid crystal panels) for three optical paths of R, G and B, respectively. The liquid crystal projector device is divided into whether a transmission type of projector or a reflection type of projector, depending on whether the liquid crystal light valve which is a center of the liquid crystal projector device is the type of transmission or the type of reflection.

Here, an optical system of a three-panel transmission type of liquid crystal projector device is constructed such that: liquid crystal light valves, each corresponding to each color of R, G and B, are disposed on three light incident planes of a polyhedral dichroic prism (cross prism) in a state of opposing to one another; and R-light, G-light and B-light, each transmitted through the corresponding liquid crystal light valve, are synthesized by means of the dichroic prism and irradiated into a projection lens.

At that time, each liquid crystal light valve generates heat owing to absorption of light or the like. Therefore, the temperature at the time of operation (will be referred to as operation temperature, hereinafter) increases. On the other hand, in the liquid crystal light valve, organic matter is used for not only the liquid crystal itself but also an orientation layer, a seal portion, a polarizing plate, a phase difference plate and the like. In addition, organic matter is also used for a flattening film and the like on a thin film transistor (TFT). Therefore, there has been worry about deterioration of reliability owing to increasing temperature or increasing quantity of light.

For this reason, an air-cooling method using a fan and a liquid-cooling method using liquid have been proposed as a method of cooling the liquid crystal light valve (liquid crystal panel). In the air-cooling method, the liquid crystal light valve is cooled by rotating a fan so as to fan air to the liquid crystal light valve. In the liquid-cooling method, the liquid crystal light valve is cooled by bringing cooling liquid into contact with the liquid crystal light valve.

However, in the air-cooling method, there have been inconveniences such that noises are generated by rotations of the fan or dust rises. In the liquid-cooling method, it is necessary to dispose a liquid-cooling container around the liquid crystal light valve, which disadvantages in regard to miniaturizing. In addition, temperature of cooling liquid is influenced by environmental temperature around the panel. Therefore, cooling effect easily becomes uneven. Furthermore, there is a problem in that sufficient cooling effect is not easily obtained. In particular, as the distance between optical members becomes short owing to miniaturizing, the environmental temperature increases accordingly. Owing to the increase of the temperature, the temperature of the cooling liquid is remarkably increased. Thus, cooling effect is expected to deteriorate.

In the future, with the progress of enhancing high luminance, high quality of images and remarkable minuteness in the liquid crystal projector device, pixel density of the liquid crystal light valve (liquid crystal panel) and density of quantity of light incident into the liquid crystal light valve will be increased. Accordingly, there has been a trend in that the operation temperature of the liquid crystal light valve increases. On the other hand, miniaturization of the liquid crystal light valve (panel size) will be improved. Therefore, it can be expected that increase of the operation temperature will be accelerated. In those cases, the conventional air-cooling method or liquid cooling method cannot restrain the temperature of the liquid crystal light valve from increasing any more, so that it will be further difficult to retain reliability thereof.

SUMMARY OF THE INVENTION

An object of the present invention is to provide a new liquid crystal display device and liquid crystal projector device, which can solve the problems that the above-mentioned conventional device has.

Another object of the invention is to provide a liquid crystal display device and a liquid crystal projector device, which can prevent deterioration of its reliability coming up with increase of temperature or increase of light quantity.

Still another object of the invention is to provide a liquid crystal display device and a liquid crystal projector device, which can efficiently cool a structure including a liquid crystal panel, and further a method of cooling a panel of the liquid crystal panel.

A liquid crystal display device according to the invention mounts a liquid crystal panel on a light incident plane of a prism in an adhered state so as to integrate the panel with the prism, and comprises cooling means forcedly cooling the integrated structure statically.

The liquid crystal display device according to the invention mounts a liquid crystal panel on a light incident plane of a prism in a bonded state and integrates the panel with the prism, and forcedly cools this integrated structure statically by cooling means. Accordingly, it becomes possible to cool the liquid crystal panel efficiently without bringing any trouble caused by fan noise or floating dust. In addition, in regard to the liquid crystal projector device using a liquid crystal panel as its liquid crystal light valve, if the same construction as the above is adopted, it becomes possible to cool the liquid crystal light valve efficiently without bringing any trouble caused by fan noise or floating dust.

Further, the liquid crystal display device and the liquid crystal projector device according to the invention mount a liquid crystal panel in a bonded state on the light incident plane of the prism through a transparent substrate having high heat conductivity and integrate the panel with the prism.

In the liquid crystal display device and the liquid crystal projector device according to the invention, a liquid crystal panel is mounted in a bonded state on the light incident plane of the prism through a transparent substrate having high heat conductivity and integrated with the prism. Accordingly, heat generated at the liquid crystal panel is absorbed by the transparent substrate and the absorbed heat is diffused by the prism. Thus, the liquid crystal panel is efficiently cooled with the prism used as a cooling bath.

Additional objects of the invention and specific advantages which may be obtained through the invention will be obvious further from the description of embodiments to be described hereinafter.

DETAILED DESCRIPTION OF PRESENTLY PREFERRED EMBODIMENTS

Hereinafter, embodiments in which the invention is applied to, for example, a three-panel transmission type liquid crystal projector device will be described in detail with reference to the accompanying drawings.

Figure 1:
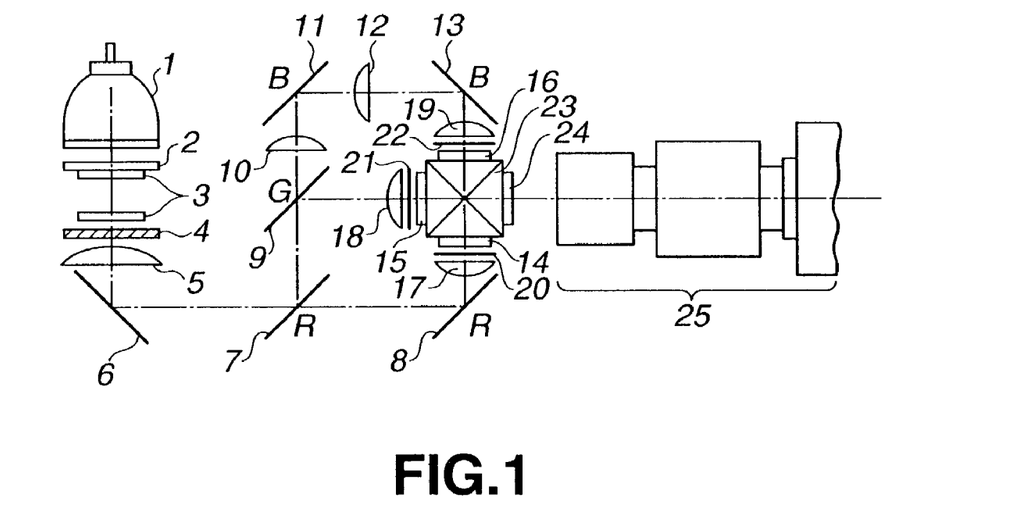
FIG. 1 is a schematic diagram showing an example of an optical system construction of a liquid crystal projector device according to the invention.

FIG. 1 is a schematic diagram showing an example of an optical system structure of a liquid crystal projector device to which the invention is applied. In FIG. 1, a lamp 1 is a light source of the liquid crystal projector device. For example, a metal halide lamp constitutes the lamp 1. In a direction of outgoing light irradiated from the lamp 1, there are disposed a UV-IR cut-off filter 2, a light integrator 3, a polarizing conversion component 4, a first lens 5 and a first total reflection mirror 6 in a sequential order.

Meanwhile, in the direction of light reflected by the first total reflection mirror 6, there are disposed a first dichroic mirror 7 and a second total reflection mirror 8 in the sequential order. In the direction of light reflected by the first dichroic mirror 7, there are disposed a second dichroic mirror 9, a second lens 10 and a third total reflection mirror 11 in the sequential order. Further, in the direction of light reflected by the third total reflection mirror 11, there are disposed a third lens 12 and a fourth total reflection mirror 13 in the sequential order.

In the direction of light reflected by the second total reflection mirror 8, a liquid crystal light valve 14 for R (red) is disposed. In the direction of light reflected by the second dichroic mirror 9, a liquid crystal light valve 15 for G (green) is disposed. Further, in the direction of light reflected by the fourth total reflection mirror 13, a liquid crystal light valve 16 for B (blue) is disposed. On light incident sides of the liquid crystal light valves 14, 15 and 16, there are disposed lenses 17, 18 and 19, and further disposed polarizing plates 20, 21 and 22, respectively. TFT liquid crystal panels, each having thin film transistors (TFT) arranged in a matrix manner therein, can be used for the liquid crystal light valves 14, 15 and 16. Hereinafter, a "liquid crystal light valve" will be referred to as a "liquid crystal panel" in the description.

In a region surrounded by the liquid crystal panels 14, 15 and 16, a dichroic prism 23 is disposed. The dichroic prism 23 constitutes a prism in the invention, and referred to as a cross prism. The dichroic prism 23 has a polyhedral (hexahedron) and quadrangular block structure constructed by bonding four prisms to each other. The dichroic prism 23 has three light incident planes and a light irradiating plane. On the light incident planes, the liquid crystal panels 14, 15 and 16 are disposed, respectively, in a state of opposing to each other. On the light irradiating plane, a polarizing plate 24 is bonded.

In the direction of light irradiated from the dichroic prism 23, a projection lens 25 is disposed. The projection lens 25 is constituted by combined plural lenses, i.e. five to ten lenses disposed on a common light axis.

In an optical system of the liquid crystal projector device constructed as the above, white light irradiated from the lamp 1 passes through the UV-IR cut-off filter 2, the light integrator 3, the polarizing conversion component 4 and the first lens 5, and comes into the first total reflection mirror 6. And there, the incident light is reflected substantially perpendicularly. At this time, the UV-IR cut-off filter 2 cuts off ultraviolet rays and infrared rays, both included in the light irradiated from the lamp 1.

The light reflected by the first total reflection mirror 6 is selectively penetrated through or reflected by the first dichroic mirror 7. That is, the first dichroic mirror 7 allows R-light to penetrate the mirror itself and reflects G- and B-light. The R-light passed through the first dichroic mirror 7 is reflected by the second total reflection mirror 8, and then passed through the lens 17 and the polarizing plate 20. After that, the passed light comes into the liquid crystal panel 14.

On the other hand, the G- and B-light reflected by the dichroic mirror 7 are selectively penetrated through or reflected by the second dichroic mirror 9. That is, the second dichroic mirror 9 allows the B-light to penetrate the mirror itself and reflects the G-light. The G-light reflected by the second dichroic mirror 9 passes through the lens 18 and the polarizing plate 21, and comes into the liquid crystal panel 15.

In addition, the B-light having penetrated the second dichroic mirror 9 passes through the second lens 10 and comes into the third total reflection mirror 11. Then the B-light is reflected substantially perpendicular by the third total reflection mirror 11. Further, the B-light reflected by the third total reflection mirror 11 passes through the third lens 12 and comes into the fourth total reflection mirror 13. Then the B-light is reflected substantially perpendicularly by the fourth total reflection mirror 13. After that, the B-light passes through the lens 19 and the polarizing plate 22, and then comes into the liquid crystal panel 16.

As described above, the light (white light) irradiated from the lamp 1 is separated into R-, G- and B-light and the separated light is irradiated into the liquid crystal panels 14, 15 and 16, respectively. Thus, on each of the three liquid crystal panels 14, 15 and 16, there is formed an optical image being in the color corresponding to each of the panels 14, 15 and 16. The optical images are formed on the liquid crystal panels 14, 15 and 16 by controlling the quantity of penetrating light for each pixel in the respective panels.

Further, the R-, G- and B-light having penetrated the liquid crystal panels 14, 15 and 16, respectively, come into the dichroic prism 23. In the dichroic prism 23, the R-, G- and B-light incident from three different directions are synthesized so as to generate one optical image constituted by the R, G and B. The optical image generated in this manner is irradiated from the light irradiating plane of the dichroic prism 23 and passes through the polarizing plate 24. Then, the image comes into the projection lens 25. The projection lens 25 enlarges the incident light (optical image) irradiated from the dichroic prism 23 and projects the enlarged optical image on a screen (not shown). Incidentally, the first, second and third lenses 5, 10 and 12 work so as to make optical paths of R, G and G the same length.

Figure 2A:
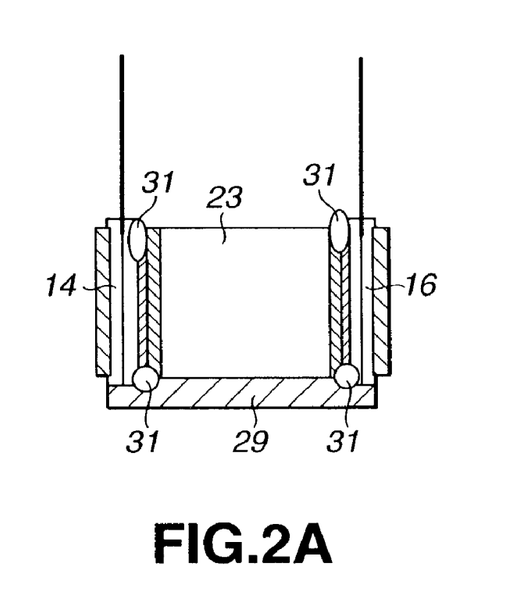
FIGS. 2A and 2B are diagrams showing a main part of a liquid crystal projector device according to a first embodiment of the invention, FIG. 2A being a side view thereof and FIG. 2B being a plan view thereof.
Figure 2B:
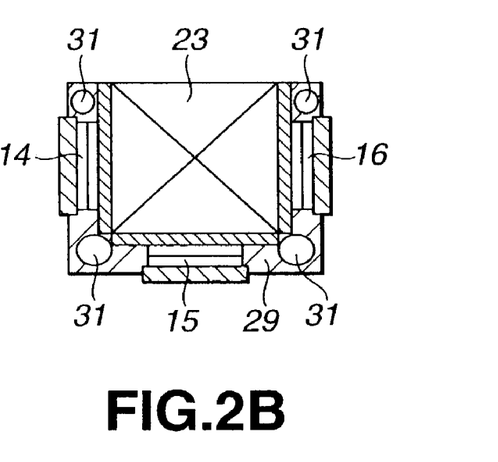
Figure 3:
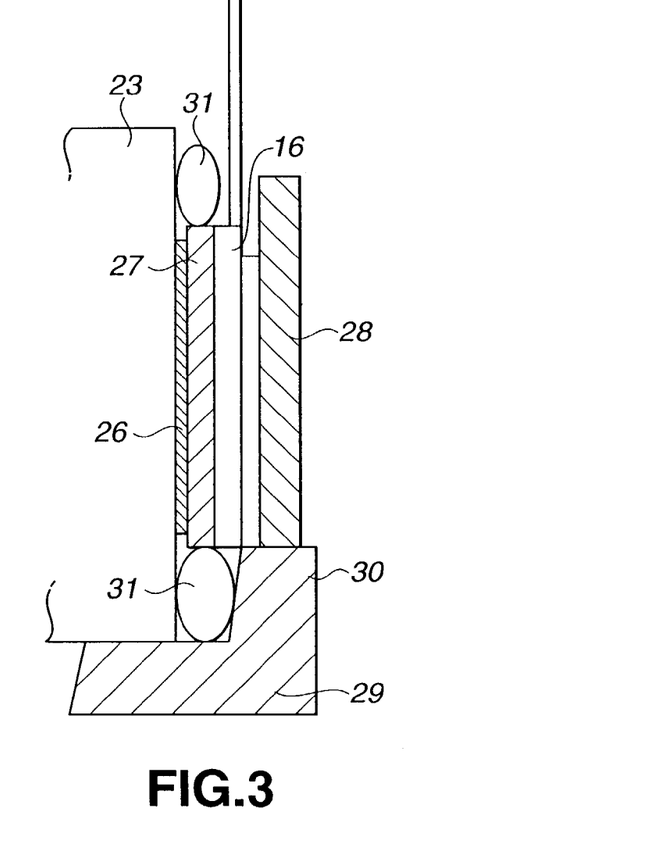
FIG. 3 is a cross-sectional view showing a main part of a construction of mounting a liquid crystal panel and a construction of cooling the same.

FIGS. 2A and 2B show an example of a main part of a construction of the liquid crystal projector device according to the first embodiment of the invention. FIG. 2A is a side view thereof, and FIG. 2B is a plan view thereof. FIG. 3 is a cross-sectional view showing a main part of the construction of mounting the liquid crystal panel in an manner of enlarging.

On the three planes of light incidence in the dichroic prism 23, as shown in FIGS. 2B and 3, the liquid crystal panels 14, 15 and 16 are mounted in a bonded manner, respectively. By doing so, the dichroic prism 23 and the liquid crystal panels 14, 15 and 16 are integrated with each other. Further, a cooling means is disposed around the dichroic prism 23 so as to forcedly cool the integrated structure constituted by the relevant dichroic prism 23 and the liquid crystal panels 14, 15 and 16 statically.

Hereinafter, a specific construction of mounting the liquid crystal panels 14, 15 and 16 to the dichroic prism 23 and a structure of the cooling means will be described with the liquid crystal panel 16 shown in FIG. 3 used as an example.

Between the dichroic prism 23 and the liquid crystal panel 16, a polarizing plate 26 and a transparent glass substrate 27 are interposed. The transparent glass substrate 27 is made of sapphire glass having high heat conductivity or the like. On the light incident side of the liquid crystal panel 16, i.e., on the side opposite to the dichroic prism 23, a dust-free plate 28 is disposed. The dust-free plate 28 is made of glass and has a function to prevent dust existing on a light path from meeting the focal length of the projection lens 25 so as to defocus.

On the plane of light incidence in the dichroic prism 23, the polarizing plate 26, the transparent glass substrate 27 and the dust-free plate 28 are mounted together with the liquid crystal panel 16 in a manner that their planes are in contact with each other. That is, one plane of the polarizing plate 26 is in contact with the light incidence plane of the dichroic prism 23. The other plane of the polarizing plate 26 is in contact with one plane of the transparent glass substrate 27. One plane of the liquid crystal panel 16 is in contact with the other plane of the transparent glass substrate 27, and the other plane of the liquid crystal panel 16 is in contact with one plane of the dust-free plate 28.

In addition, the dichroic prism 23, the polarizing plate 26, the transparent glass substrate 27, the liquid crystal panel 16 and the dust-free plate 28 are bonded to each other with use of a transparent adhesive made of ultraviolet hardening resin. For the adhesive, it is desired to use resin which has substantially the same refractive index as the material of the dichroic prism 23, for example, resin of n=1.4 to 1.6. The reason for that is to suppress light reflection (interface reflection) at contact interfaces between components. For resin to be used as the adhesive, acrylic resin, urethane resin, epoxy resin, silicon resin or the like is employed, for example. Further, a silicon gel, oil or the like can be also employed.

On the bottom face of the dichroic prism 23, a heat sink 29 is provided in a state of being in contact with the bottom face. The heat sink 29 is made of metal material having high heat conductivity, for example, aluminum. The heat sink 29 has a quadrangular block construction from a plane view. A riser portion 30 is formed at an end portion of the heat sink 29 in an integrated manner. An upper end face of the riser portion 30 is in contact with the liquid crystal panel 16 and the dust-free plate 28.

A heat pipe 31 is drawn around the panel-mounting portion of the dichroic prism 23. The heat pipe 31 constitutes a heat sink of the cooling means according to the invention. On the upper portion side of the dichroic prism 23, the heat pipe 31 is disposed in a state of being contact with the dichroic prism 23 and the transparent glass substrate 27. On the lower portion side of the dichroic prism 23, the heat pipe 31 is disposed in a state of being in contact with not only the dichroic prism 23 and the transparent glass substrate 27 but also with the heat sink 29. In regard to the heat sink 29, the heat pipe 31 is in contact with two parts of the inside corners which are formed by the riser portion 30.

In the structure described above, when the liquid crystal panel generates heat by absorbing light, the heat is sucked and diffused by various heat transfer routes. As the various heat transfer routes, the following routes are available, such as: a route leading to the heat sink 29 via the dust-free plate 28; a route leading to the heat pipe 31 from the transparent glass substrate 27; a route that the heat is absorbed by the heat pipe 31 with air around the panel used as heating medium; a route leading to the heat sink 29 via the transparent glass substrate 27, the polarizing plate 26 and the dichroic prism 23; a route leading to the heat pipe 31 from the heat sink 29; a route that the heat is diffused into the air from the heat sink 29; a route that the heat is diffused into the air from the dust-free plate 28; and the like.

In particular, according to the invention, the liquid crystal panel 16 is mounted to the dichroic prism 23 in a bonded state so that the heat transfer area between the two parties is secured widely. Further, the heat pipe 31 is drawn around the dichroic prism 23. Therefore, it is possible to efficiently suck the heat transferred from the liquid crystal panel 16 to the dichroic prism 23 by the heat pipe 31 in addition to that the heat generated at the liquid crystal panel 16 is directly sucked by the heat pipe 31.

In addition, according to the invention, the transparent glass substrate 27 having high heat conductivity is interposed between the dichroic prism 23 and the liquid crystal panel 16. Therefore, it is possible to suppress thermal resistance between the liquid crystal panel 16 and the dichroic prism 23 to the low extent. Further, the heat pipe 31 is in contact with the transparent glass substrate 27. Therefore, it is possible to suck the heat generated at the liquid crystal panel 16 by the transparent glass substrate 27, thereby efficiently sucking the sucked heat by the heat pipe 31.

In addition, the heat sink 29 is in contact with the bottom face of the dichroic prism 23 and the heat pipe 31 is in contact with the heat sink 29. Therefore, it is possible to suck the heat transferred from the liquid crystal panel 16 to the dichroic prism 23 by the heat sink 29, thereby efficiently sucking the sucked heat by the heat pipe 31.

As a result, the liquid crystal panel 16 is integrated with the dichroic prism 23 having a large heat capacity and forcedly cooled statically. Thus, it is possible to sufficiently reduce the operation temperature of the liquid crystal panel 16 without dynamically cooling the liquid crystal panel with use of a fan as like the conventional manner. In addition, the heat pipe 31 is used as a heat sink of the cooling means. Therefore, it is possible to stably obtain a sufficient cooling effect without any influence of environmental temperature. Furthermore, by combining the transparent glass substrate 27, the heat sink 29 and the like, it is possible to obtain a higher cooling effect.

Incidentally, in the first embodiment described above, the transparent glass substrate 27 is interposed between the dichroic prism 23 and the liquid crystal panel 16. However, the transparent glass substrate 27 may be bonded on the light incident side of the liquid crystal panel 16.

Figure 4:
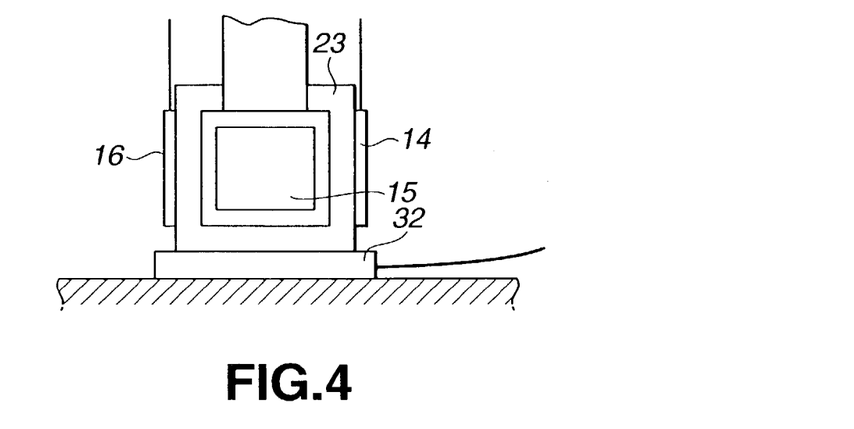
FIG. 4 is a side view showing an example of a main structure of a liquid crystal projector device according to a second embodiment of the invention.

A second embodiment of the liquid crystal projector device according to the invention now will be described. In the liquid crystal projector device, as shown in FIG. 4, the liquid crystal panels 14, 15 and 16 are directly bonded on three light incident planes of the dichroic prism 23, respectively, so that the dichroic prism 23 and the respective liquid crystal panels 14, 15 and 16 are integrated with each other. For adhesion of the liquid crystal panels 14, 15 and 16, it is desired to use the same adhesive as one in the first embodiment described above so as to suppress reflection at jointing interfaces.

On the bottom face of the dichroic prism 23, a Peltier cooling component 32 is disposed in a state of being in contact with the bottom face thereof. The Peltier cooling component 32 constitutes a heat sink of the cooling means according to the invention.

In the structure described above, the liquid crystal panels 14, 15 and 16 are in directly contact with, and further bonded to the dichroic prism 23. Therefore, the heat generated at the respective liquid crystal panels 14, 15 and 16 are transferred to the dichroic prism 23. In addition, the Peltier cooling component 32 is in contact with the bottom face of the dichroic prism 23. Therefore, the heat transferred to the dichroic prism 23 as described above is sucked by the Peltier cooling component 32.

Accordingly, the structure constituted by integrating the dichroic prism 23 and the liquid crystal panels 14, 15 and 16 is forcedly cooled statically by the Peltier cooling component 32. Therefore, it is possible to sufficiently reduce the operation temperature of the liquid crystal panels 14, 15 and 16 without dynamically cooling the liquid crystal panels with use of a fan as like the conventional manner. In addition, the Peltier cooling component 32 is used as the heat sink of the cooling means. Thus, it is possible to stably obtain a sufficient cooling effect without any influence of environmental temperature.

Figure 5A:
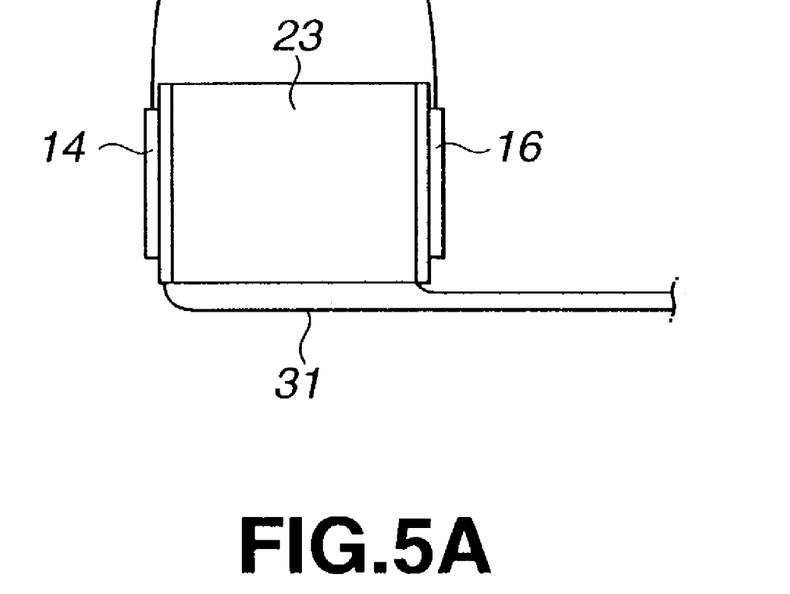
FIGS. 5A and 5B are diagrams for explaining a modification of the second embodiment of the invention.
Figure 5B:
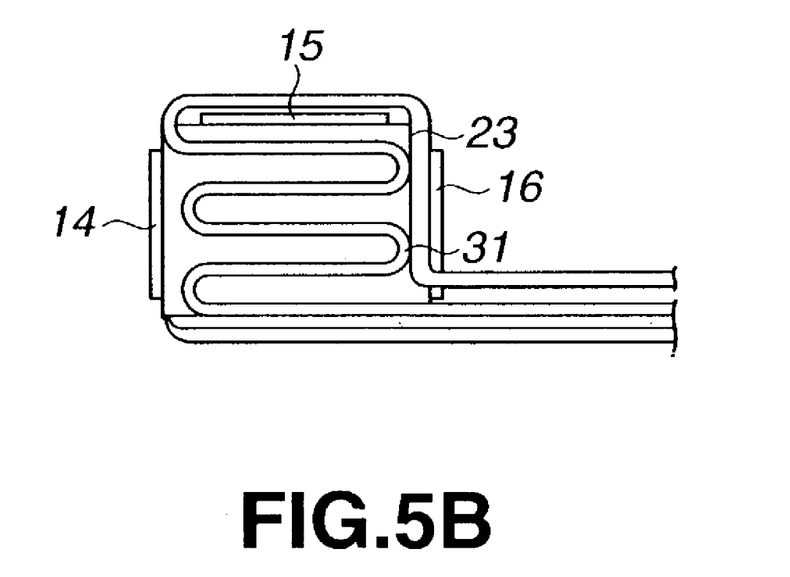

Incidentally, in the liquid crystal projector device of the second embodiment described here, the Peltier cooling component 32 is used as the heat sink. However, instead of the Peltier cooling component 32, the heat pipe 31 may be used as shown in the side view FIG. 5A and the bottom view FIG. 5B, for example. By drawing the heat pipe 31 on the bottom face of the dichroic prism 23 in a state of being contact with the relevant bottom face, the same effect as one described above can be obtained. Further, by drawing the heat pipe 31 in the form of surrounding the periphery of each of the liquid crystal panels 14, 15 and 16, the heat generated at the respective liquid crystal panels 14, 15 and 16 is sucked by the heat pipe 31, thereby obtaining a high cooling effect.

Figure 6:
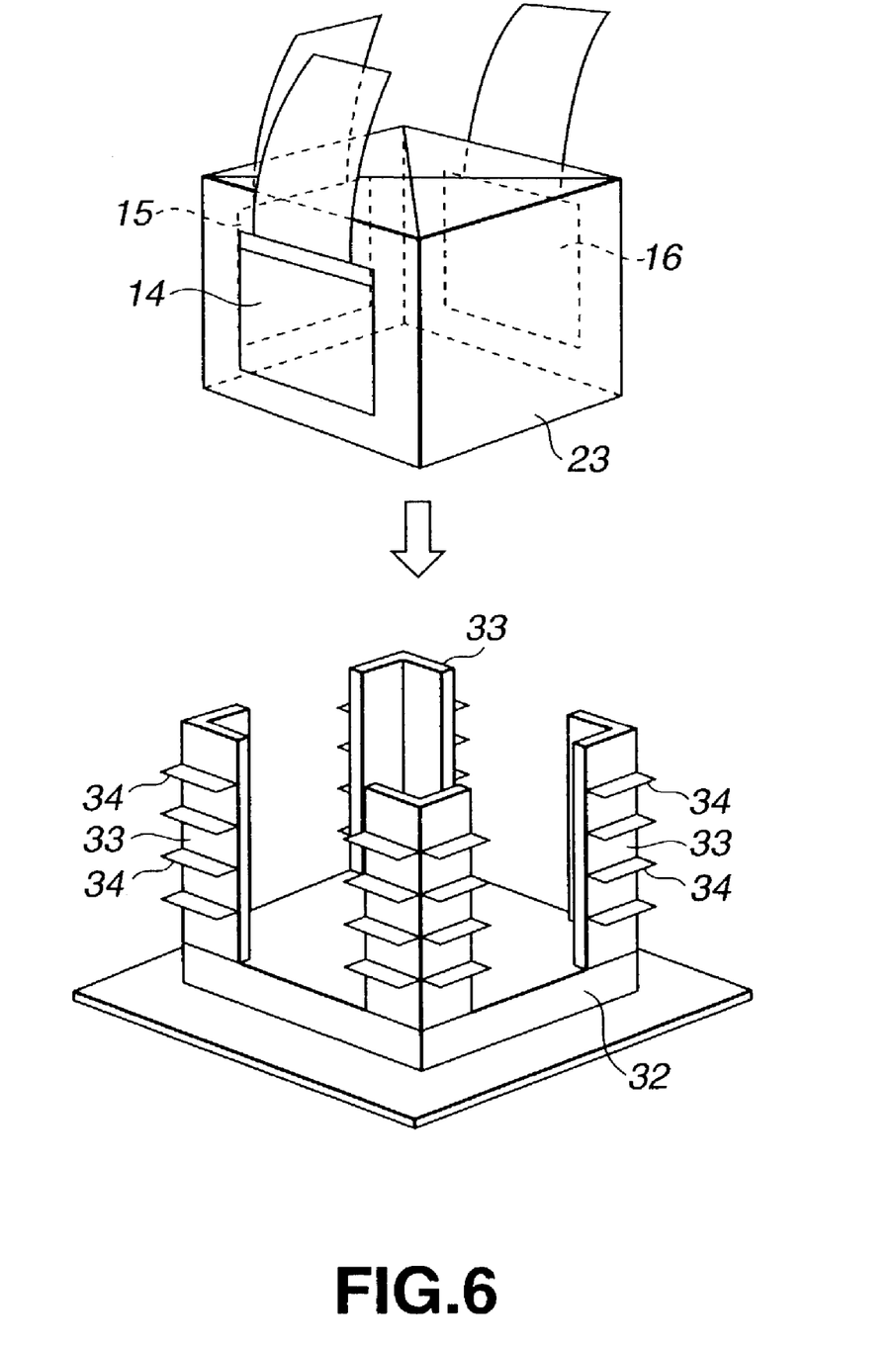
FIG. 6 is a perspective view showing an example of a main structure of a liquid crystal projector device according a third embodiment of the invention.

A third embodiment of the liquid crystal projector device according to the invention now will be described. This liquid crystal projector device is constructed, in the same manner as one described in the second embodiment, in that the respective liquid crystal panels 14, 15 and 16 are directly bonded on three light incident planes of the dichroic prism 23 as shown in FIG. 6. With this structure, the liquid crystal projector device is constructed in that the dichroic prism 23 and the respective liquid crystal panels 14, 15 and 16 are integrated with each other.

The Peltier cooling component 32 that serves as a heat sink has a quadrangular shape from a plane view. Supporting members 33 are raised at four corners of the quadrangle. Each of the supporting members 33 is constituted by a long L-shape plate. On the outer plane thereof, a plurality of fins 34 is mounted in a longitudinal direction. Both the supporting members 33 and fins 34 are made of a metal material (for example, aluminum) having high heat conductivity.

In the structure as described above, the dichroic prism 23 is mounted on the Peltier cooling component 32 while four corners of the dichroic prism 23 are engaged with the supporting members 33. With this structure, the Peltier cooling component 32 comes into contact with the bottom face of the dichroic prism 23. In addition, the respective liquid crystal panels 14, 15 and 16, which mounted on the dichroic prism 23 in a bonded state, are disposed in a manner of being fixed between two of the supporting members 33.

With the above structure, the heat generated at the liquid crystal panels 14, 15 and 16 is transferred to the dichroic prism 23. The transferred heat is sucked by the Peltier cooling component 32. While being sucked by the Peltier cooling component 32 through the four supporting members 33, the heat generated at the liquid crystal panels 14, 15 and 16, and the heat transferred to the dichroic prism 23 are diffused into the air through the fins 34.

As a result, the structure constituted by integrating the dichroic prism 23 and the liquid crystal panels 14, 15 and 16 with each other is forcedly cooled statically by the Peltier cooling component 32 and the supporting members 33 with fins 34. Therefore, even the liquid crystal panels are not cooled with use of a fan as like the conventional manner, the operation temperature of the liquid crystal panels 14, 15 and 16 can be reduced sufficiently. Further, in this embodiment, the Peltier cooling component 32 is used as the heat sink of the cooling means. Therefore, a sufficient cooling effect can be obtained stably without any influence of environmental temperature. Furthermore, since cooling effects provided by the supporting members 33 and the fins 34 are added, a higher cooling effect can be obtained.

Incidentally, in the first, second and third embodiment, there has been described the case in which the heat pipe 31 or the Peltier cooling component 32 is used as the heat sink of the cooling means. However, in the structure according to the first embodiment shown in FIG. 2 and FIG. 3, for example, the Peltier cooling component 32 is disposed in the state of being in contact with the bottom face of the heat sink 29. Then, it is also possible to employ the structure in which both the heat pipe 31 and the Peltier cooling component 32 are used as the heat sink.

In addition, a fan can be used as an auxiliary cooling means together with the above described components. In this case, a high cooling effect can be obtained with so-called breezing movement, in which the fan is rotated at the suppressed speed. Therefore, fan noise can be reduced to the level at which no problem substantially occurs. Further, dust is restrained from whirling to the less extent owing to a decrease in the wind quantity. Therefore, a harmful effect on quality of image to be caused by floating dust can be suppressed.

Figure 7:
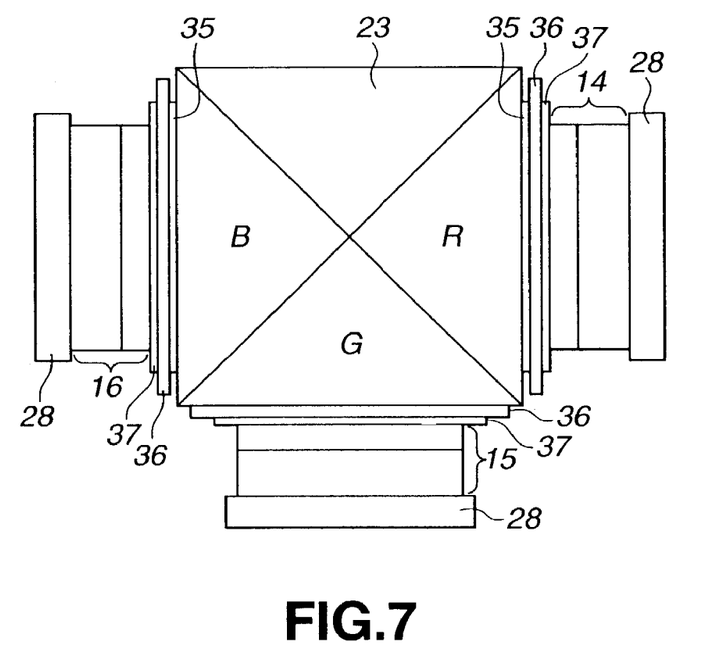
FIG. 7 is a plan view showing an example of a construction of integrating a prism with a liquid crystal panel.
Figure 8:
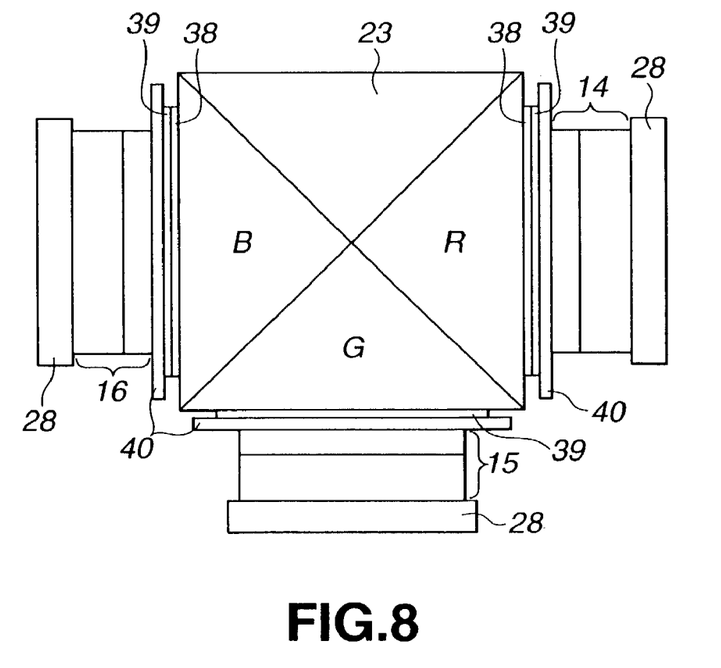
FIG. 8 is a plan view showing another example of a construction of integrating the prism with the liquid crystal panel.

Further, various modifications can be considered for the structure of mounting the liquid crystal panels 14, 15 and 16 to the dichroic prism 23. For example, as shown in FIG. 7, a construction can be considered in that a phase difference plate 35, a sapphire substrate 36 and a polarizing plate 37 are interposed between the dichroic prism 23 and the liquid crystal panels 14, 15 and 16, and these components are integrated with each other in a bonded state. In this case, it is preferable that the sapphire substrate 36 and the phase difference plate 35 are formed larger than the liquid crystal panels so as to increase heat conductivity. In addition, as shown in FIG. 8, a construction can be considered in that a phase difference plate 38, a polarizing plate 39 and a sapphire substrate 40 are interposed between the dichroic prism 23 and the liquid crystal panels 14, 15 and 16, and these components are integrated with each other in a bonded state.

Figure 9:
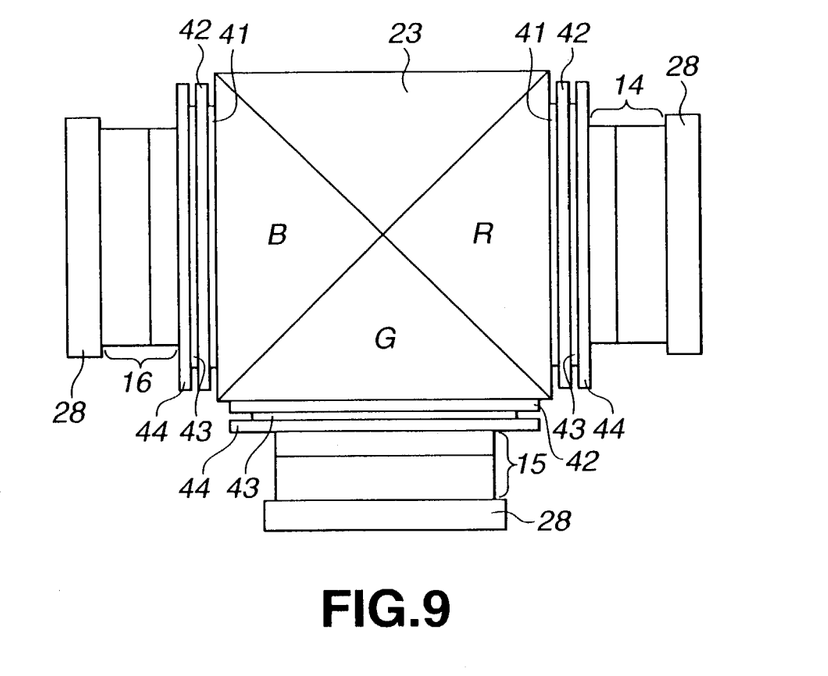
FIG. 9 is a plan view showing the other example of a construction of integrating the prism with the liquid crystal panel.

Furthermore, for another modification, as shown in FIG. 9, a construction can be considered in that a phase difference plate 41, a first sapphire substrate 42, a polarizing plate 43 and a second sapphire substrate 44 are interposed between the dichroic prism 23 and the liquid crystal panels 14, 15 and 16, and these components are integrated with each other in a bonded state. Alternatively, as shown in FIG. 10, a construction can be also considered in that a first sapphire substrate 45, a phase difference plate 46, a polarizing plate 47 and a second sapphire substrate 48 are interposed between the dichroic prism 23 and the liquid crystal panels 14, 15 and 16, and these components are integrated with each other in a bonded state.

Figure 10:
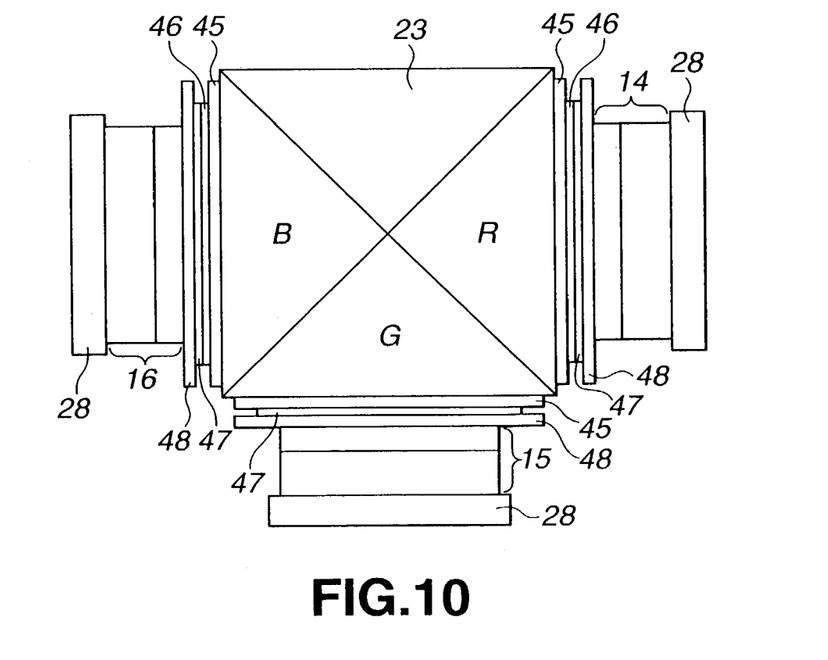
FIG. 10 is a plan view showing still another example of a construction of integrating the prism with the liquid crystal panel.

In the examples of the integrated construction shown in FIG. 9 and FIG. 10, degrees of freedom for designing are increased, furthermore, it becomes easy to produce a bonded construction. In addition, the components are bonded separately, and glass, sapphire or the like may be finally bonded thereto. Needless to say, in either of construction examples, the heat pipe and the Peltier cooling component are to be mounted on a lower portion (bottom face), effective pixel periphery and an upper face of the prism. In such a construction example described above, the polarizing plate and the phase difference plate can be heating sources. Therefore, by interposing these optical element substrates between the dichroic prism and the liquid crystal panels so as to integrate the relevant prism with the relevant liquid crystal panels, cooling ability is increased and thus reliability of the component is increased.

Further, sapphire glass, Ten-packs glass or the like is interposed between optical component substrates such as the polarizing plate, phase difference plate, etc. so as to unify heat conductivity. In addition, a component whose glass surface is coated with a transparent conductive film (ITO film, for example) having good heat conductivity is used, so that heat conductivity can be expected to increase.

A fourth embodiment of the liquid crystal projector device according to the invention now will be described with reference to drawings.

Figure 11:
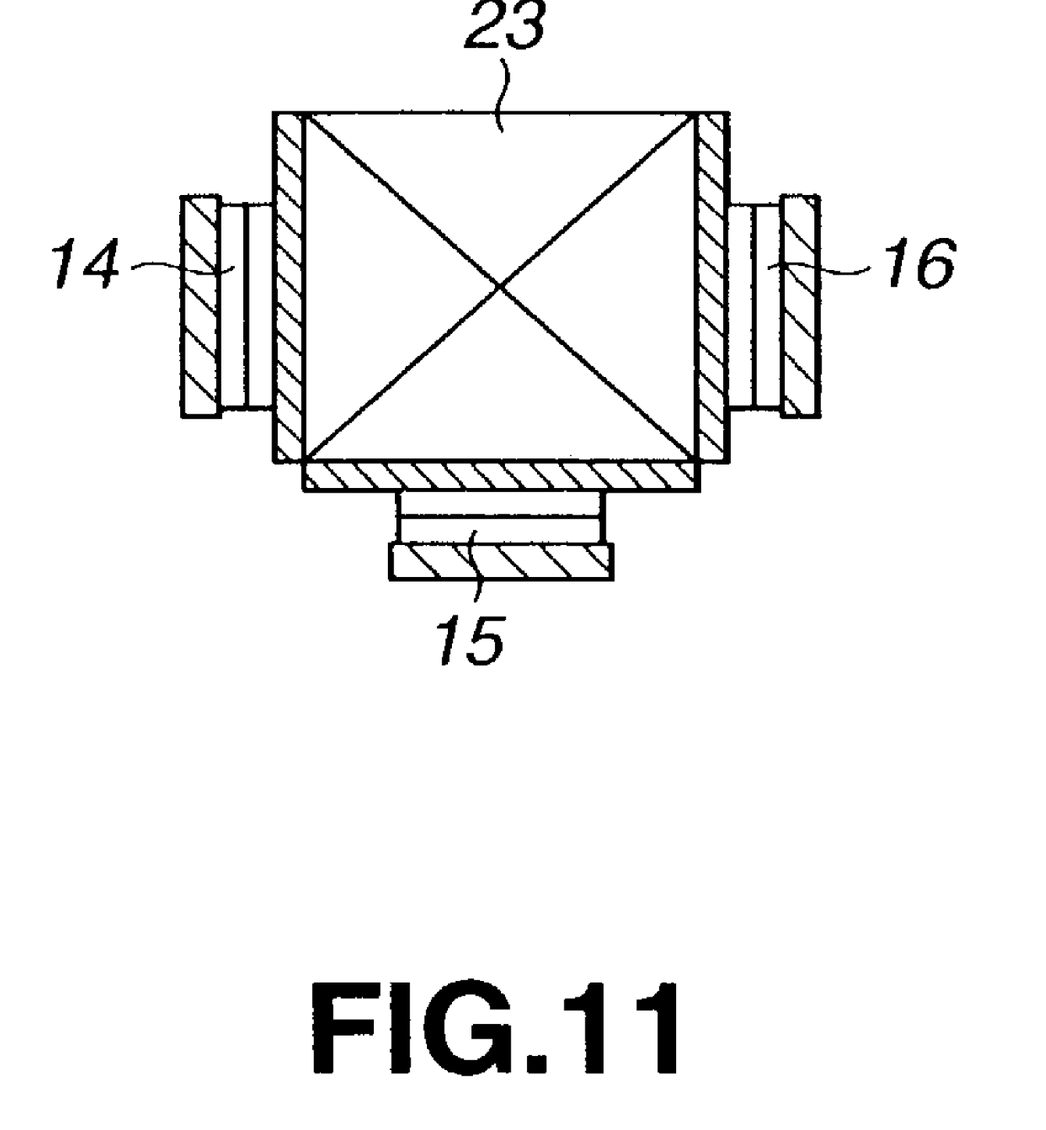
FIG. 11 is a plan view showing an example of a main part structure of a liquid crystal projector device according to a fourth embodiment of the invention.

This liquid crystal projector device is also constructed, in the same manner as one described in the first to third embodiments, in that the respective liquid crystal panels 14, 15 and 16 are mounted on three light incident planes of the dichroic prism 23 in a bonded state as shown in FIG. 11. With this structure, the dichroic prism 23 and the respective liquid crystal panels 14, 15 and 16 are integrated with each other.

Figure 12:
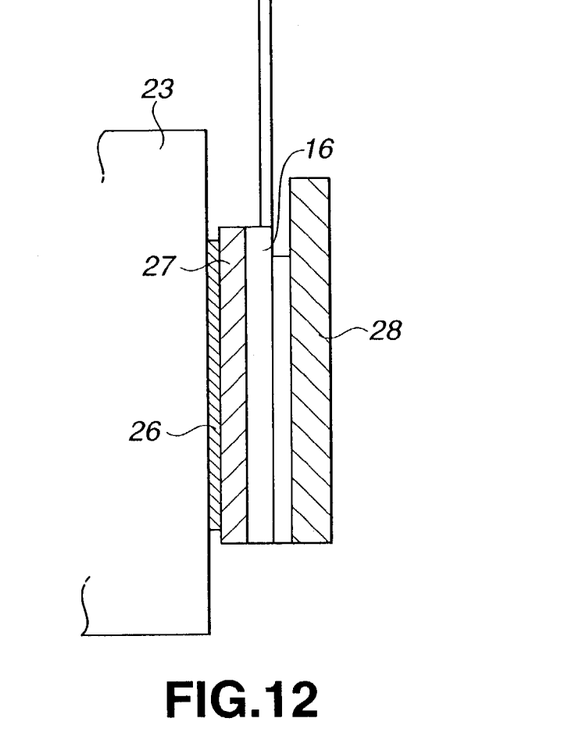
FIG. 12 is a cross-sectional view showing a main part of a construction of mounting a liquid crystal.

Hereinafter, a specific construction of mounting the liquid crystal panels 14, 15 and 16 to the dichroic prism 23 will be described with the liquid crystal panel 16 shown in FIG. 12 used as an example.

Between the dichroic prism 23 and the liquid crystal panel 16, the polarizing plate 26 and the transparent glass substrate 27 are interposed. The transparent glass substrate 27 to be used in the embodiment is desirably made of substrate materials having high heat conductivity, for example, sapphire glass, Vycol, ZerodurR, Ten-packs glass or the like. Incidentally, it is desirable to use materials having no double refraction for the material of the transparent glass substrate 27.

On the light incident side of the liquid crystal panel 16, i.e., on the side opposite to the dichroic prism 23, a dust-free plate 28 is disposed. The dust-free plate 28 is made of glass and has a function to prevent dust existing on a light path from meeting focal length of the projection lens 25 so as to defocus.

The polarizing plate 26, the transparent glass substrate 27 and the dust-free plate 28 are mounted on the plane of light incidence in the dichroic prism 23, together with the liquid crystal panel 16 in a manner that their planes are in contact with each other. That is, one plane of the polarizing plate 26 is in contact with the light incidence plane of the dichroic prism 23. The other plane of the polarizing plate 26 is in contact with one plane of the transparent glass substrate 27. One plane of the liquid crystal panel 16 is in contact with the other plane of the transparent glass substrate 27, and the other plane of the liquid crystal panel 16 is in contact with one plane of the dust-free plate 28.

In addition, the dichroic prism 23, the polarizing plate 26, the transparent glass substrate 27, the liquid crystal panel 16 and the dust-free plate 28 are bonded to each other with use of a transparent adhesive. For the adhesive, it is desired to use resin which has substantially the same refractive index as the material of the dichroic prism 23, for example, resin of n=1.4 to 1.6 or ultraviolet hardening resin. The reason for that is to suppress light reflection (interface reflection) at contact interfaces between components. For resin to be used as the adhesive, acrylic resin, urethane resin, epoxy resin, silicon resin or the like is employed, for example. Further, a silicon gel, oil or the like can be also employed.

In the structure described above, the transparent glass substrate 27 having high heat conductivity is interposed between the dichroic prism 23 and the liquid crystal panel 16. Therefore, it is possible to suppress thermal resistance between the liquid crystal panel 16 and the dichroic prism 23 to the low extent. Further, it is possible that the heat generated at the liquid crystal panel 16 is sucked by the transparent glass substrate 27, and this sucked heat is diffused efficiently from the transparent glass substrate 27 and the dichroic prism 23. In this regard, the other liquid crystal panels 14 and 15 also have the same function.

As a result, the liquid crystal panels 14, 15 and 16 are cooled efficiently with the dichroic prism 23 having a large heat capacity used as a cooling bath. Thus, it is possible to sufficiently reduce the operation temperature of the liquid crystal panels 14, 15 and 16 without cooling the liquid crystal panels with use of a fan as like the conventional manner. Further, in regard to the structure in which each of the liquid crystal panels 14, 15 and 16 is mounted to the dichroic prism 23 with the transparent glass substrate 27 interposed therebetween, it is possible to be applied to a manufacturing method in which, a plurality of liquid crystal panels are formed on a glass substrate having large diameter, and then the glass substrate is cut along a predetermined line, thereby simultaneously obtaining the plurality of the liquid crystal panels divided into pieces.

A fifth embodiment of the liquid crystal projector device according to the invention now will be described with reference to FIG. 13 and FIG. 14. In this liquid crystal projector device, a specific construction of mounting the liquid crystal panels 14, 15 and 16 to the dichroic prism 23 will be described with the liquid crystal panel 16 used as an example in the same manner as the above embodiment.

Figure 13:
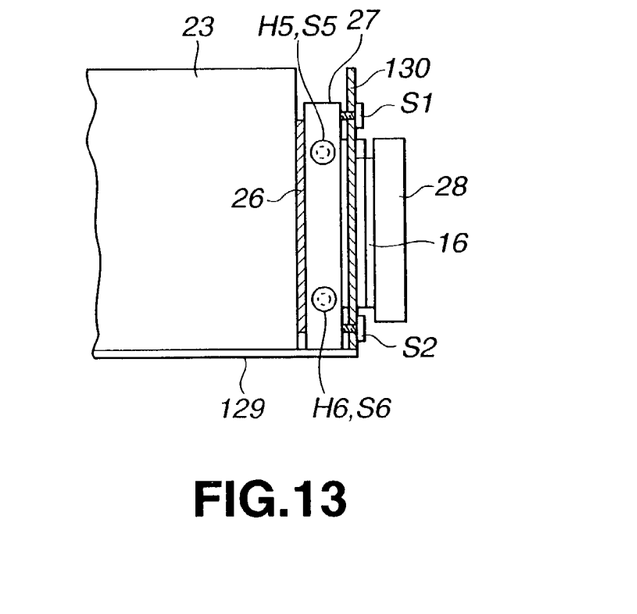
FIG. 13 is a partially sectional view showing a main structure of a liquid crystal projector device according to a fifth embodiment of the invention.
Figure 14:
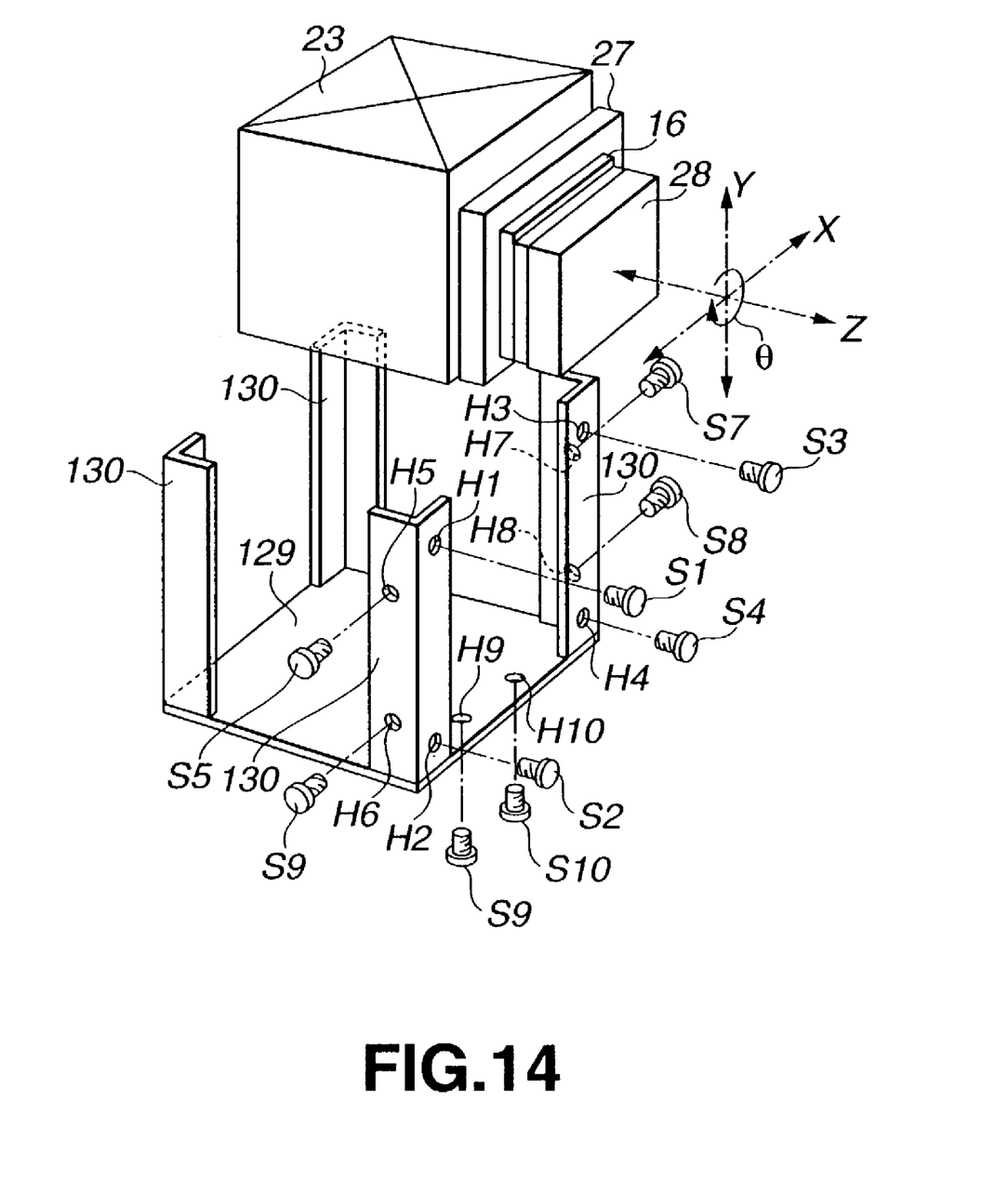
FIG. 14 is an exploded perspective diagram showing a main structure of the liquid crystal projector device according to the fifth embodiment of the invention.

In FIGS. 13 and 14, the polarizing plate 26, the transparent glass substrate 27, the liquid crystal panel 16 and the dust-free plate 28 are bonded to each other with use of an adhesive. The liquid crystal panel 16 is mounted to the dichroic prism 23 in a detachable manner by a contact bonding method.

More specifically, supporting members 130 are raised at four corners of a base plate 129 whose plane shape being rectangular. The base plate 129 can be formed in an integrated manner with a chassis portion of the liquid crystal projector device. Each supporting member 130 is a long L-shaped plate, and desirably made of metal materials having high heat conductivity, for example, aluminum, iron steel, or the like.

Screw holes H1 to H8, eight holes in total, are provided in two supporting members 130 corresponding to the mounting position of the liquid crystal panel 16 among the four supporting members 130. Two screw holes H9 and H10 are provided in the base plate 129. Among the screw holes, the screw holes H1 to H4 are used for fixing the liquid crystal panel 16 to the dichroic prism 23 by contact bonding. On the other hand, the screw holes H5 to H8, H9 and H10 are used for adjusting the mounting position of the liquid crystal panel 16 in a lateral direction, i.e., in an arrow X direction in FIG. 14, in a vertical direction, i.e., in an arrow Y direction in FIG. 14, and in a rotation direction, i.e., in an arrow θ direction in FIG. 14.

In the case where the liquid crystal panel 16 is mounted to the dichroic prism 23 with use of the base plate 129 and the four supporting members 130 constructed as the above, firstly, the dichroic prism 23 is located at a predetermined position on the base plate 129 and then fixed. Fixing the dichroic prism 23 is performed by bonding the bottom face of the relevant dichroic prism 23 on the upper face of the base plate 129 through an adhesive. Accordingly, the dichroic prism 23 is disposed within the space surrounded by the four supporting members 130.

Next, an integrated parts which is constructed by bonding the polarizing plate 26, the transparent glass substrate 27, the liquid crystal panel 16 and dust-free plate 28 to each other is disposed close to the light incident plane of the dichroic prism 23. In this case, the integrated parts described above is assembled from above with the transparent glass substrate 27 inserted between the two supporting members 30 which have the eight screw holes H1 to H8. Accordingly, the four screw holes H1 to H4 are disposed in a state of opposing to each other with predetermined openings interposed on the front of the transparent glass substrate 27, which is other than an effective pixel region outside the liquid crystal panel 16. The four screw holes H5 to H8 are disposed in a state of opposing to each other through predetermined openings on the sides of the transparent glass substrate 27. The two screw holes H9 and H10 are disposed in a state of opposing to each other on the lower end face of the transparent glass substrate 27.

Then, screws S1 to S10 are screwed into the screw holes H1 to H10, respectively. At the same time, the mounting position of the liquid crystal panel 16 is adjusted by rotating the screws S1 to S10 appropriately. The screws S1 to S10 may be screwed into the supporting members 130 in advance in the step prior to fixing the dichroic prism 23, or in the step prior to inserting the integrated parts including the liquid crystal panel 16.

The positioning adjustment of the liquid crystal panel 16 is performed while watching the image actually shown on a screen. In regard to the procedure for the adjustment, firstly, the screws S1 to S4 to be screwed into the four screw holes H1 to H4 are brought into contact with the front of the transparent glass substrate 27, and the transparent glass substrate 27 is pressed lightly toward the dichroic prism 23 side by pressing pressure given by the screws S1 to S4. Accordingly, the polarizing plate 26 is pressed lightly against the light incidence plane of the dichroic prism 23. In this state, when the screws S5 to S8, S9 and S10 are rotated, the position of the transparent glass substrate 27 is changed in accordance with the rotation directions and the degrees of rotations of the respective screws, and the position of the liquid crystal panel 16 is also changed in a manner of integrating with the change. Therefore, the mounting position of the liquid crystal panel 16 against the dichroic prism 23 can be adjusted (fine adjustment) in various directions.

In other words, the mounting position of the liquid crystal panel 16 can be adjusted in the lateral direction, i.e., in the arrow X direction in FIG. 14 by rotating the screws S5 to S8 appropriately. In addition, by rotating the screws S9 and S10 appropriately, the mounting position of the liquid crystal panel 16 can be adjusted in the vertical direction, i.e., in the arrow Y direction in FIG. 14. Further, by rotating the screws S5 to S8, S9 and S10 appropriately, the mounting position of the liquid crystal panel 16 can be adjusted in the rotation direction, i.e., in the arrow θ direction in FIG. 14, that is, the inclination adjustment can be performed.

Incidentally, if the mounting position of the liquid crystal panel 16 can be adjusted in the lateral direction, vertical direction and rotation direction, the number of screws and screw holes may be set arbitrarily. In addition, if the liquid crystal panel 16 is mounted in a bonded state on the plane of light incidence of the dichroic prism 23 through the polarizing plate 26 and the transparent glass substrate 27, it is possible to highly accurately determine the position of the panel in the light axis direction in the arrow Z direction in FIG. 14 against the dichroic prism 23. Thus, it becomes unnecessary to adjust the panel position in the light axis direction. In addition, it also becomes unnecessary to adjust the parallelism of the panel against the plane of light incidence of the dichroic prism 23.

As described above, after adjusting the mounting position of the liquid crystal panel 16, the liquid crystal panel 16 is fixed to the dichroic prism 23 together with the transparent glass substrate 27 by tightening up the screw S1 to S4. In this-case, the transparent glass substrate 27 may be fixed by the screws S1 to S4 with use of packing. In addition, the part, at which the screws S1 to S4 are screwed and fixed to the supporting members 30, can be fixed and reinforced with use of fixing means such as an instantaneous adhesive agent or the like, so as to prevent misplacement of the liquid crystal panel 16, which is caused by looseness of the screws or the like. In a case of using the packing to the screwing part, the part is reinforced and fixed including the packing.

As described above, the liquid crystal projector device according to the fifth embodiment of the invention is constructed in that the liquid crystal panel 16 is mounted in a detachable manner to the dichroic prism 23 by the contact bonding method using screws. Therefore, replacement of components or the like can be easily carried out. Accordingly, even when some inconvenience occurs to the liquid crystal panels for example, it is possible to deal with replacement of the troubled parts or restoring of the liquid crystal panels easily. In addition, the integrated parts constituted by the polarizing plate 26, the transparent glass substrate 27, the liquid crystal panel 16 and the dust-free plate 28 is not directly bonded to the dichroic prism 23 through an adhesive. Therefore, it becomes easy to handle the component in a assemble process. What's more, it becomes easy to maintain clean environment, thereby effectively restraining refuse and dust from generating.

Further, the liquid crystal projector device comprises a position adjustment function for adjusting the mounting position of the liquid crystal panels. Therefore, a mutual position between the three liquid crystal panels 14, 15 and 16 can be adjusted accurately and easily. Accordingly, it becomes possible to harmonize pixels of red (R), green (G) and blue. (B) accurately on a screen, thereby forming a fine image.

Incidentally, a method of fixing the liquid crystal panels 14, 15 and 16 to the dichroic prism 23 is not limited to the aforementioned method of contact bonding using the screws. For example, it is possible to employ the following bonding method. The bonding method is constructed in that; the transparent glass substrate 27 is pressed together with the polarizing plate 26 on the plane of light incidence of the dichroic prism 23 through a adhesive layer, which is in a non-hardened state or in a half-hardened state; then, in this state, the position of the panels is adjusted in the above-described manner; after that, the panels are fixed by completely hardening (permanent hardening) the adhesive layer.

In the aforementioned embodiments according to the invention, examples have been described with the invention applied to the liquid crystal projector device. However, the invention can be applied not only to the liquid crystal projector device but also to the entire liquid crystal display device employing a structure in which a liquid crystal panel is disposed in a manner of opposing to a plane of light incidence of a prism. In this case, advantages similar to ones in the case where the invention is applied to the aforementioned liquid crystal projector device can be obtained.

INDUSTRIAL APPLICABILITY

As described above, according to the invention, the liquid crystal panels are mounted in an adhered manner on the plane of light incidence of the prism and integrated with each other. Then, this integrated structure is forcibly cooled statically by cooling means. Accordingly, the liquid crystal panels can be cooled efficiently without any trouble caused by fan noise or a raise of dust.

In addition, according to the invention, the liquid crystal panels are mounted on the plane of light incidence of the prism through the transparent substrate having high heat conductivity in an adhered manner and integrated with each other. Accordingly, the liquid crystal panels can be cooled efficiently without any trouble caused by fan noise or a raise of dust.

By applying the invention to the liquid crystal projector device using the liquid crystal panels for the liquid crystal light valves, it becomes possible for the device to project fine images on a screen under very quiet use environment. In addition, a cooling effect to the liquid crystal panels is increased by the integrated construction with the prism. Therefore, the operation temperature of the liquid crystal panels can be reduced remarkably. Furthermore, in regard to miniaturization of the device, miniaturization the liquid crystal panels accompanied by the miniaturization of the device and improvement in luminance of images, it is possible to suppress the operation temperature of the liquid crystal panels to the low extent and retain high reliability.

The invention claimed is:

1. A liquid crystal display device, comprising:
a liquid crystal panel mounted on a light incident plane of a prism;
a first sapphire substrate disposed between the liquid crystal panel and the light incident plane of the prism, the first sapphire substrate directly contacting the liquid crystal panel;
a polarizing plate disposed between the first sapphire substrate and the light incident plane of the prism, the polarizing plate directly contacting the first sapphire substrate;
a phase difference plate and a second sapphire substrate disposed between the polarizing plate and the light incident plane of the prism, one of the phase difference plate and the second sapphire substrate directly contacting the polarizing plate, the other of the phase difference plate and the second sapphire substrate directly contacting the light incident plane of the prism; and
a cooling device forcedly cooling the integrated structure statically, the cooling device including at least one of a Peltier cooling component and a heat pipe as a heat sink of the cooling device and directly contacting the prism,
wherein the liquid crystal panel, the light incident plane of the prism, the phase difference plate, the first sapphire substrate, the second sapphire substrate, and the polarizing plate are an integrated structure that effects cooling of its components.

2. A liquid crystal projector device, comprising:
a liquid crystal light valve mounted on a light incident plane of a prism;
a first sapphire substrate disposed between the liquid crystal light valve and the light incident plane of the prism, the first sapphire substrate directly contacting the liquid crystal light valve;
a polarizing plate disposed between the first sapphire substrate and the light incident plane of the prism, the polarizing plate directly contacting the first sapphire substrate;
a phase difference plate and a second sapphire substrate disposed between the polarizing plate and the light incident plane of the prism, one of the phase difference plate and the second sapphire substrate directly contacting the polarizing plate, the other of the phase difference plate and the second sapphire substrate directly contacting the light incident plane of the prism; and
a cooling device forcedly cooling the integrated structure statically, the cooling device including at least one of a Peltier cooling component and a heat pipe as a heat sink of the cooling device and directly contacting the prisms, wherein the liquid crystal light valve, the light incident plane of the prism, the phase difference plate, the first sapphire substrate, the second sapphire substrate, and the polarizing plate are an integrated structure that effects cooling of its components.

3. A method of cooling a panel, the method comprising the steps of:

mounting a liquid crystal panel on a light incident plane of a prism with a first sapphire substrate disposed between the liquid crystal panel and the light incident plane of the prism, the first sapphire substrate directly contacting the liquid crystal panel, a polarizing plate disposed between the first sapphire substrate and the light incident plane of the prism, the polarizing plate directly contacting the first sapphire substrate, and a phase difference plate and a second sapphire substrate disposed between the polarizing plate and the light incident plane of the prism, one of the phase difference plate and the second sapphire substrate directly contacting the polarizing plate, the other of the phase difference plate and the second sapphire substrate directly contacting the light incident plane of the prism; and forcedly cooling the integrated structure statically by bringing at least one of a Peltier cooling component and a heat pipe as a heat sink of a cooling device directly in contact with the prism, wherein the liquid crystal panel, the light incident plane of the prism, the phase difference plate, the first sapphire substrate, the second sapphire substrate, and the polarizing plate are an integrated structure that effects cooling of its components.

* * * * *